US011866220B2

(12) United States Patent
Christman et al.

(10) Patent No.: US 11,866,220 B2
(45) Date of Patent: Jan. 9, 2024

(54) IDENTIFICATION OF SHRINK-WRAPPED OBJECTS

(71) Applicant: Sealed Air Corporation (US), Charlotte, NC (US)

(72) Inventors: Russell T. Christman, Dunstable, MA (US); Donald Durant, Andover, MA (US); David Cenedella, Shirley, MA (US); Michael Anthony Kalinowski, Nashua, NH (US); Thomas P. Orsini, Leominster, MA (US); Steven E. Maston, Princeton, NJ (US)

(73) Assignee: Sealed Air Corporation (US), Charlotte, NC (US)

( * ) Notice: Subject to any disclaimer, the term of this patent is extended or adjusted under 35 U.S.C. 154(b) by 684 days.

(21) Appl. No.: 17/011,415

(22) Filed: Sep. 3, 2020

(65) Prior Publication Data

US 2020/0399007 A1 Dec. 24, 2020

Related U.S. Application Data

(62) Division of application No. 16/493,396, filed as application No. PCT/US2018/022571 on Mar. 15, 2018, now Pat. No. 10,787,286.

(Continued)

(51) Int. Cl.
*B65C 9/00* (2006.01)
*B65B 53/02* (2006.01)

(Continued)

(52) U.S. Cl.
CPC ............ *B65C 9/0015* (2013.01); *B65B 11/48* (2013.01); *B65B 21/245* (2013.01); *B65B 53/00* (2013.01);

(Continued)

(58) Field of Classification Search
CPC . B65C 9/0015; B65C 1/02; B65C 2009/0018; B65B 11/48; B65B 53/00; B65B 53/02; B65D 71/08
See application file for complete search history.

(56) References Cited

U.S. PATENT DOCUMENTS 3,207,300 A 9/1965 Farmer
3,289,386 A 12/1966 Farmer
(Continued)

FOREIGN PATENT DOCUMENTS

WO 2011143382 A1 11/2011
WO 2018026984 A1 2/2018

OTHER PUBLICATIONS

Written Opinion of the International Searching Authority in PCT/US2018/022571, dated Sep. 20, 2018.

*Primary Examiner* — Christopher R Harmon
(74) *Attorney, Agent, or Firm* — Jon M. Isaacson

(57) ABSTRACT

An object can be heat-shrinkable packaged by placing an object inside of heat-shrinkable film, sealing the heat-shrinkable film around the object to form a heat-shrinkable package, coupling a first portion of a label to the heat-shrinkable package, and causing the heat-shrinkable film to shrink into heat-shrunk film and the heat-shrinkable package to form into a heat-shrunk package. The label includes an identifier on a second portion of the label. The label remains coupled to the heat-shrunk film after the heat-shrinkable film is caused to shrink into heat-shrunk film. The second portion of the label remains substantially undeformed after the heat-shrinkable film is caused to shrink into heat-shrunk film.

14 Claims, 9 Drawing Sheets

Related U.S. Application Data

(60) Provisional application No. 62/472,051, filed on Mar. 16, 2017.

(51) Int. Cl.

| | |
|---|---|
| ***B65C 1/02*** | (2006.01) |
| ***B65B 53/00*** | (2006.01) |
| ***B65B 21/24*** | (2006.01) |
| ***B65B 11/48*** | (2006.01) |
| ***B65D 71/08*** | (2006.01) |

(52) U.S. Cl.

CPC ................ *B65B 53/02* (2013.01); *B65C 1/02* (2013.01); *B65C 2009/0018* (2013.01); *B65D 71/08* (2013.01)

(56) References Cited

U.S. PATENT DOCUMENTS

| | | | | |
|---|---|---|---|---|
| 3,424,306 | A | 1/1969 | Munck | |
| 3,525,428 | A | 8/1970 | Stephan | |
| 3,557,516 | A | 1/1971 | Brandt | |
| 3,752,312 | A * | 8/1973 | Soltanoff | G09F 3/14 40/6 |
| 3,920,123 | A | 11/1975 | Martelli | |
| 4,166,532 | A | 9/1979 | Ikuma et al. | |
| 4,205,750 | A | 6/1980 | Dews | |
| 4,338,768 | A | 7/1982 | Ballestrazzi et al. | |
| 4,423,584 | A * | 1/1984 | Elsner | B65B 61/202 53/399 |
| 4,516,267 | A | 5/1985 | Kent et al. | |
| 4,555,025 | A | 11/1985 | Weinberg et al. | |
| 4,700,528 | A | 10/1987 | Bernard | |
| 4,735,668 | A * | 4/1988 | Hoffmann | B65C 3/16 156/215 |
| 4,757,667 | A * | 7/1988 | Elsner | B29C 66/133 53/442 |
| 4,770,731 | A | 9/1988 | Ferguson | |
| 4,779,731 | A | 10/1988 | Fujio | |
| 4,958,735 | A | 9/1990 | Odabashian | |
| 5,257,704 | A | 11/1993 | Gutt | |
| 5,369,936 | A | 12/1994 | Callahan et al. | |
| 5,398,427 | A | 3/1995 | Tolson | |
| 5,788,076 | A | 8/1998 | Simmons | |
| 5,792,536 | A | 8/1998 | Whipp | |
| 5,866,181 | A | 2/1999 | Hill | |
| 6,113,720 | A * | 9/2000 | Fresnel | B65C 3/065 428/347 |
| 6,273,986 | B1 | 8/2001 | Egan | |
| 6,322,864 | B1 | 11/2001 | Fresnel | |
| 6,360,462 | B1 | 3/2002 | Mengel | |
| 6,616,189 | B2 | 9/2003 | Raming | |
| 6,880,313 | B1 * | 4/2005 | Gessford | B65D 71/08 53/442 |
| 7,157,127 | B2 | 1/2007 | Schmelzer | |
| 7,370,761 | B2 | 5/2008 | Anderson et al. | |
| 7,686,513 | B2 | 3/2010 | Knoerzer et al. | |
| 7,819,243 | B2 | 10/2010 | Brophy et al. | |
| 8,424,272 | B2 | 4/2013 | Cerf | |
| 8,794,438 | B2 | 8/2014 | Copp et al. | |
| 9,809,343 | B2 | 11/2017 | Bowers et al. | |
| 10,428,467 | B2 * | 10/2019 | Chung | D21H 21/16 |
| 2002/0166787 | A1 | 11/2002 | Linton | |
| 2003/0168373 | A1 | 9/2003 | Fresnel | |
| 2005/0017995 | A1 | 1/2005 | Pferrer | |
| 2009/0104314 | A1 * | 4/2009 | Dellinger | A21B 3/13 426/138 |
| 2013/0055682 | A1 | 3/2013 | Beneddtti et al. | |
| 2017/0066580 | A1 * | 3/2017 | Howells | B65B 61/14 |
| 2020/0002042 | A1 * | 1/2020 | Christman | B65B 21/245 |

* cited by examiner

IDENTIFICATION OF SHRINK-WRAPPED OBJECTS

CROSS-REFERENCE TO RELATED APPLICATIONS

This application is a divisional of U.S. application Ser. No. 16/493,396, filed Sep. 12, 2019, which is a national stage under 35 U.S.C. § 371 of International Application No. PCT/US2018/022571, filed Mar. 15, 2018, which claims the benefit of U.S. Provisional Application No. 62/472,051, filed Mar. 16, 2017, the contents of each of which are hereby incorporated by reference in their entirety.

BACKGROUND

The present disclosure is in the technical field of object packaging and identification. More particularly, the present disclosure is directed to identifying objects after they have been placed in heat-shrink packaging, such as opaque heat-shrunk packaging.

In many cases, objects are packaged for shipment in packaging that is opaque to prevent the objects from been seen by third parties during shipment. Opaque packaging can also be used to keep objects unseen in other circumstances, such as protection of confidential information, object storage, gift wrapping, and the like. While such opaque protection can be very useful in certain circumstances, it also hinders identification of the objects in the packaging. For example, after an object is placed in a cardboard box and the cardboard box is taped closed, an observer cannot tell the contents of that box without either opening the box or having some form of identification on the outside of the box. For this reason, identification, such as shipping labels, are typically placed on opaque packaging immediately after the object is placed in the packaging. However, such immediate labeling is not practical or feasible in all circumstances, such as when an object is wrapped in heat-shrinkable film that will later be heat shrunk around the package.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method is performed to package an object. The method includes placing an object inside of heat-shrinkable film, sealing the heat-shrinkable film around the object to form a heat-shrinkable package, coupling a first portion of a label to the heat-shrinkable package, and causing the heat-shrinkable film to shrink into heat-shrunk film and the heat-shrinkable package to form into a heat-shrunk package. The label includes an identifier on a second portion of the label. The label remains coupled to the heat-shrunk film after the heat-shrinkable film is caused to shrink into heat-shrunk film. The second portion of the label remains substantially undeformed after the heat-shrinkable film is caused to shrink into heat-shrunk film.

In one example, the heat-shrunk film is opaque. In another example, the identifier contains information identifying at least one of the object or the heat-shrunk package. In another example, the identifier contains information that is human- and/or machine-readable. In another example, the information remains human- and/or machine-readable after the heat-shrinkable film is caused to shrink into heat-shrunk film.

In another example, the label is a partially-adhesive label comprising an adhesive exposed on one side of the first portion the label. In another example, coupling the label to the heat-shrinkable package comprises adhering the exposed adhesive to the heat-shrinkable film. In another example, the method further includes creating a second label based on information obtained from the identifier and coupling the second label on at least one of the heat-shrunk film or the label. In another example, the method further includes removing the label from the heat-shrunk film before coupling the second label to the heat-shrunk film, where the second label is coupled to the heat-shrunk film in place of the removed label. In another example, the second label is coupled to at least the heat-shrunk film and the label such that the label is covered by the second label. In another example, the label includes a side that is covered by adhesive and the method further includes forming the partially-adhesive label by folding the label from an unfolded state to a folded state by folding the adhesive against itself so that at least a portion of the adhesive remains exposed when the label is in the folded state.

In another example, coupling the label to the heat-shrinkable package comprises a label film in the form of a band that spans a side of the heat-shrinkable package. In another example, sealing the heat-shrinkable film around the object to form the heat-shrinkable package comprises forming a leading edge seal and a trailing edge seal in the heat-shrinkable film. In another example, forming the leading edge seal and the trailing edge seal in the heat-shrinkable film comprises sealing a first end of the band of the label film to the leading edge seal and sealing a second end of the band of the label film to the trailing edge seal. In another example, under conditions that cause the heat-shrinkable film to shrink into the heat-shrunk film, the label film is configured to shrink less than or equal to a percentage of shrinkage of the heat-shrinkable film, and wherein the percentage of the shrinkage of the heat-shrinkable film is any one of the following values: 10%, 20%, 30%, 40%, or 50%.

In another embodiment, a package includes an object, heat-shrunk film forming a heat-shrunk package around the object, and a label coupled to the heat-shrunk film. The heat-shrunk film is formable from a heat-shrinkable film by a heat shrink process. A first portion of the label is coupled to the heat-shrunk film and a second portion of the heat shrunk film includes an identifier. The second portion of the label is configured to remain substantially undeformed after undergoing the heat shrink process that causes the heat-shrinkable film to shrink into heat-shrunk film.

In one example, the heat-shrunk film is opaque. In another example, the identifier contains information identifying at least one of the object or the heat-shrunk package. In another example, the label is a partially-adhesive label comprising an adhesive exposed on one side of the first portion the label. In another example, the label includes a label film in the form of a band that spans a side of the heat-shrunk package. In another example, a first end of the band of the label film is sealed to a leading edge seal in the heat-shrunk film and a second end of the band of the label film is sealed to a trailing edge seal in the heat-shrunk film. In another example, the package further includes a second label coupled to one or more of the heat-shrunk film or the label. In another example, the identifier includes machine-readable information configure to be read by one or more computing devices configured to cause the second label to be printed in response to reading the machine-readable information.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The present disclosure describes embodiments of coupling a label to heat-shrinkable packages that can be read after the heat shrink process to identify the objects in the packages and/or the packages themselves. A portion of the label is coupled to the heat shrinkable film and another portion of the label includes an identifier. The portion of the label that includes the identifier does not substantially deform during the heat-shrink process. This allows the label to be placed on the package before the heat-shrink process and for the identifier to remain human- and/or machine-readable following the heat-shrink process. These embodiments, variations of these embodiments, and additional embodiments of labeling heat-shrinkable packages are discussed in greater detail below.

Figure 1:
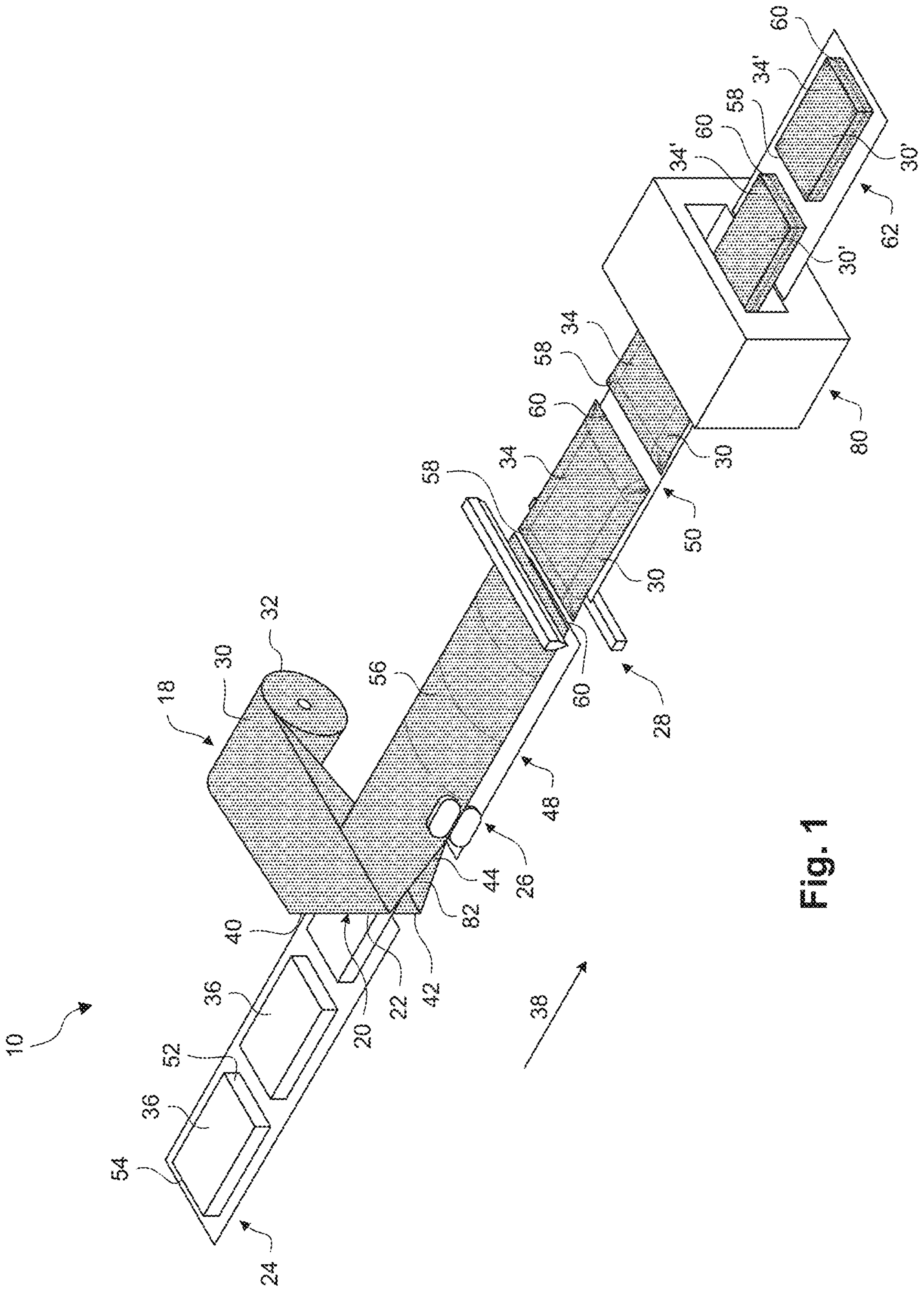
FIG. 1 depicts an embodiment of a continuous shrink wrap system, in accordance with the embodiment disclosed herein.

FIG. 1 depicts an embodiment of a shrink wrap system 10. In the depicted embodiment, the shrink wrap system 10 is a continuous shrink wrap system that is capable of receiving a stream of objects, independently surrounding each of the objects with shrinkable wrap, and then shrinking the shrinkable wrap around the objects. In other embodiments, the shrink wrap system 10 is a non-continuous packaging system. In the depicted embodiment, the shrink wrap system 10 includes a shrink film dispenser 18, a transfer head 20 including an inverting head 22, an infeed conveyor 24, a longitudinal sealer 26, and an end sealer 28, as will be described in more detail herein.

The shrink film dispenser 18 of the continuous flow wrap machine supplies a web of heat-shrinkable film 30 from roll 32. Systems for supplying webs of film are known in art and may include unwind mechanisms and other features. Heat-shrinkable films have the ability, upon being exposed to a certain temperature, to shrink or to generate shrink tension when used in a packaging application. Once a product is enclosed in the heat-shrinkable film, the packaged product is subjected to an elevated temperature by subjecting the packaged product to a hot fluid, such as hot air or hot water. This causes the film to shrink forming a tight wrap surrounding the enclosed packaged product. In some embodiments, heat-shrinkable film may be opaque. Embodiments of opaque shrink films are described in U.S. Application No. 62/370,258, entitled “Opaque, Heat Shrinkable Microlayer Film”, the contents of which are hereby incorporated by references in their entirety.

As used herein, the term “opaque” may be defined in terms of one or more of total luminous transmittance, opacity, or contrast ratio opacity. Total luminous transmittance may be defined as the percentage of luminous flux that passes through a film when visible light is transmitted at the film. In some embodiments, a film is opaque if the film has a total luminous transmittance that is at or below any one of the following values: 10%, 20%, 30%, 40%, 50%, 60%, 65%, 70%, 75%, 80%, 85%, and 90%, measured in accordance with ASTM D1003. Opacity may be defined as the percentage of luminous flux that does not pass through a film when visible light is transmitted at the film. Opacity may be defined according to the formula 100%−total transmittance=opacity. In some embodiments, a film is opaque if the film has a total luminous transmittance that is at or above any one of the following values: 10%, 20%, 30%, 40%, 50%, 60%, 65%, 70%, 75%, 80%, 85%, and 90%. Contrast ratio opacity measurement characterizes how opaque a film sample is using two readings: a Y (luminance or brightness) value measured with the film sample backed by a black background and a Y value measured with the film sample backed by a white background. The resulting fraction is expressed as Y %, calculated as follows:

$$\text{Opacity}(Y) = \frac{Y_{black\ backing}}{Y_{white\ backing}} \times 100$$

In some embodiments, a film is opaque if the contrast ratio opacity for the film is at least, and/or at most, any one of the following values: 10%, 20%, 30%, 40%, 50%, 60%, 65%, 70%, 75%, 80%, 85%, and 90%, calculated per above with base values measured in accordance with ASTM D1746.

In some embodiments, the heat-shrinkable film 30 on the roll 32 is a center folded film. In other embodiments, the heat-shrinkable film 30 on roll 32 is a flat wound film. In some embodiments, the heat-shrinkable film 30 includes any sheet or film material suitable for packaging objects 36, in particular for heat-shrinkable packages 34 for use as a mailer containing an object. Suitable materials include polymers, for example thermoplastic polymers (e.g., polyethylene), that are suitable for heat sealing and/or heat shrinking. In some embodiments, the heat-shrinkable film 30 has a thickness of any of at least 3, 5, 7, 10, and 15 mils; and/or at most any of 25, 20, 16, 12, 10, 8, 6 and 5 mils. In some embodiments, the heat-shrinkable film 30 is multilayered, and has an outer layer adapted for heat sealing the heat-shrinkable film to itself to form a seal.

The transfer head 20 of the packaging system 10 receives the web of heat-shrinkable film 30 from the shrink film dispenser 18. The transfer head 20 is adapted to manage (e.g., form) the web of heat-shrinkable film 30 into a configuration for eventual sealing into a tube. In the depicted embodiment, the transfer head 20 is an inverting head 22 of continuous flow wrap that receives the web of heat-shrinkable film 30 that is center-folded from the shrink film dispenser 18 and redirects the web of film over the top and bottom inverting head arms 40, 42 to travel in a conveyance direction 38 by turning the web of film inside out. In this manner, the transfer head 20 is adapted to manage the web of film 30 to provide an interior space 44 bounded by the heat-shrinkable film 30.

In some embodiments, the transfer head 20 in the configuration of a forming box receives the lay flat web of heat-shrinkable film 30 from the shrink film dispenser 18 and redirects the web of film over the forming head to travel in the conveyance direction 38 by turning the web of heat-shrinkable film 30 inside out. In this manner, the transfer head 20 is adapted to manage the web of heat-shrinkable film 30 to provide an interior space 44 bounded by heat-shrinkable film 30.

The infeed conveyor 24 of packaging system 12 is adapted to transport a series of objects 36 and sequentially deliver them in the conveyance direction 38. In some embodiments, the infeed conveyor 24 is adapted to convey a series of objects 36. In the embodiment depicted in FIG. 1, the objects 36 have a similar size. In other embodiments, the objects 36 have varied or differing sizes. Within the series of objects 36 in sequential order, a "preceding" object is upstream from a "following" object. The infeed conveyor 24 is configured to deliver in repeating fashion a preceding object upstream from a following object into the interior space 44 of the web of heat-shrinkable film 30. In some embodiments, the objects 36 are delivered in spaced or gapped arrangement from each other.

An "object," as used herein, may comprise a single item for packaging, or may comprise a grouping of several distinct items where the grouping is to be in a single package. Further, an object may include an accompanying informational item, such as a packing slip, tracking code, a manifest, an invoice, or printed sheet comprising machine-readable information (e.g., a bar code) for sensing by an object reader (e.g., a bar code scanner).

Downstream from the infeed conveyor 24 is an object conveyor 48, which is adapted to support and transport the web of heat-shrinkable film 30 and the object 36 downstream together to the end sealer 28. A first discharge conveyor 50 transports the series of packages 34 from the end sealer 28.

As each object 36 of the series of objects sequentially travels through the packaging system 12, its position within the machine is tracked. This is accomplished by ways known in the art. For example, an infeed eye system (horizontal or vertical) determines the location of the front edge 52 of each object and the location of the rear edge 54 of each object as the object travels along the conveyor. This location information is communicated to a controller (i.e., a programmable logic controller or "PLC"). A system of encoders and counters, also in communication with the PLC, determines the amount of travel of the conveyor on which the object is positioned. In this manner, the position of the object 36 itself is determined and known by the PLC. The PLC is also in communication with the end sealer 28 to provide the object position information for a particular object to these unit operations.

In the depicted embodiment, the longitudinal sealer 26 adapted to continuously seal the open side of the heat-shrinkable film 30 together to form a tube 56 enveloping one of the objects 36. In the depicted embodiment, the longitudinal sealer 26 is located at side of the tube 56, where the longitudinal sealer 26 forms a side seal between two edge portions of the heat-shrinkable film 30. In other embodiments, the longitudinal sealer 26 may be located beneath the tube 56, where the sealer may form, for example, a center fin seal between two edge portions of the web of the heat-shrinkable film 30. As two edge portion of the heat-shrinkable film 30 are brought together at the longitudinal sealer 26 to form the tube 56, they are sealed together, for example, by a combination of heat and pressure, to form a continuous fin or a side seal. Appropriate longitudinal sealers are known in the art, and include, for example, heat sealers.

The end sealer 28 is adapted to provide or perform in repeating fashion, while the tube 56 is traveling: (i) a trailing edge seal 58 that is transverse to the tube 56 and upstream from a preceding object to create a heat-shrinkable package 34 and (ii) a leading edge seal 60 transverse to the tube 56 and downstream from a following object. Further, the end sealer 28 is adapted to sever the heat-shrinkable package 34 from the tube 56 by cutting between the trailing edge seal 58 and the leading edge seal 60. Generally, the end sealer 28 uses temperature and/or pressure to make two seals (trailing edge seal 58 and leading edge seal 60) and cuts between them, thus creating the final, trailing seal of one finished, preceding package and the first, leading edge seal of the following package. Advantageously, the end sealer 28 may be adapted to simultaneously sever the heat-shrinkable package 34 from the tube 56 while providing the trailing edge seal 58 and leading edge seal 60.

Useful end sealer units are known in the art. These include, for example, rotary type of end sealer units, having matched heated bars mounted on rotating shafts. As the film tube passes through the rotary type, the rotation is timed so it coincides with the gap between objects. A double seal is produced and the gap between the two seals is cut by an integral blade to separate individual packs. Another type of end seal unit is the box motion type, having a motion that describes a "box" shape so that its horizontal movement increases the contact time between the seal bars and the film. Still another type of end sealer unit is the continuous type, which includes a sealing bar that moves down with the tube while sealing.

The first discharge conveyor 50 transports the series of packages 34 from the end sealer 28 to a heat shrink system 80. The heat shrink system 80 is configured to raise the temperature of the packages to cause the heat-shrinkable wrap of the packages 34 to shrink around the objects 36 to form heat-shrunk packages 34'. In some embodiments, the heat shrink system 80 is configured to subject the packages 34 to a hot fluid, such as hot air or hot water, in order to cause the heat-shrinkable wrap of the packages 34 to shrink around the objects 36. The shrink wrap system 10 further includes a second discharge conveyor 62 configured to transport the heat-shrunk packages 34' from the heat shrink system 80.

One benefit to the use of opaque heat-shrink films is the ability to minimize the amount of packaging material used to package the objects 36. For example, one of the objects 36 can be packaged into the heat-shrunk package 34' and the object 36 can be shipped in the heat-shrunk package 34' without any further protective packaging (e.g., foam cushioning, exterior cardboard boxes, etc.). This is especially the case where the object includes its own packaging (e.g., the object includes a product packaged with cushioning inside a container) or the object does not require additional cushioning materials to be secure during shipping.

One difficulty with opaque heat-shrinkable film is the inability to identify the objects 36 in the packages 34 and/or the heat-shrunk packages 34'. Once the packages 34 and/or heat-shrunk packages 34' are formed, it may be difficult or impossible to ascertain which object 36 is within the heat-shrinkable package 34 or the heat-shrunk package 34' without breaking the film that makes up the heat-shrinkable package 34 or the heat-shrunk package 34'. This can be especially problematic where many different types of objects 36 are packaged into heat-shrunk packages 34' in a continuous flow. In would be advantageous to provide a means of identifying the contents of heat-shrunk packages 34' without having to break the film that makes up the heat-shrunk package 34'.

Figure 2A:
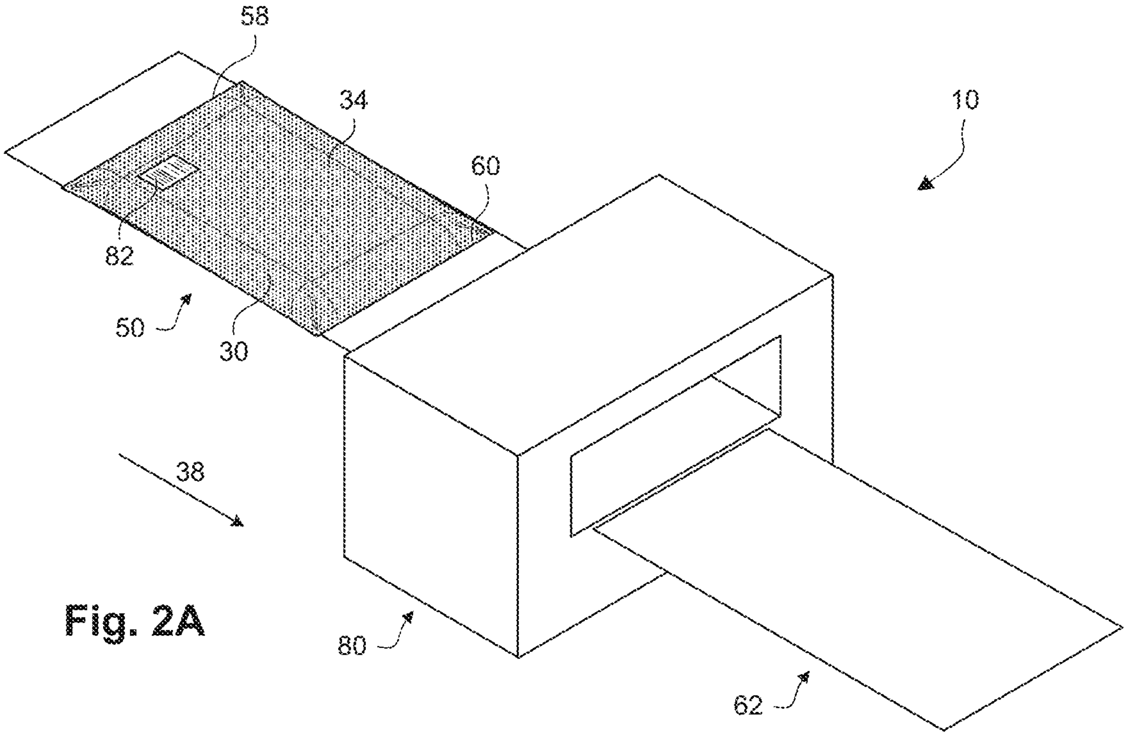
FIGS. 2A and 2B depict an embodiment of identifying a heat-shrunk package using an adhesive label, in accordance with the embodiment disclosed herein.
Figure 2B:
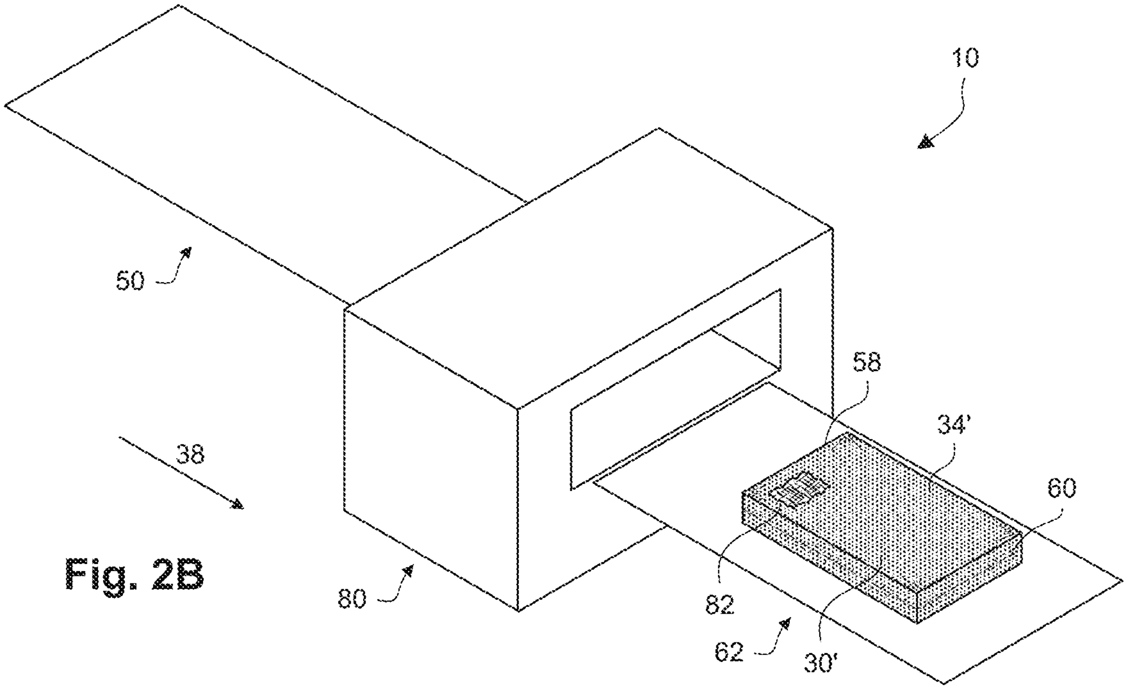

Depicted in FIGS. 2A and 2B is an embodiment of identifying a heat-shrunk package 34' using an adhesive label. A portion of the shrink wrap system 10 is shown in each of FIGS. 2A and 2B, and each of FIGS. 2A and 2B depicts a different instance in time. In the instance shown in FIG. 2A, a label 82 has been placed on the heat-shrinkable package 34 before it is transported to the heat shrink system 80 in the conveyance direction 38. In some embodiments, the label 82 contains an identifier usable to identify the object 36 in the heat-shrinkable package 34 and/or the heat-shrinkable package 34 itself. Some examples of identifier included on the label can include human-readable information and/or a computer-readable code (e.g., barcode, quick response (QR) code, etc.) identifying the object 36, a serial number of the object 36, shipping information for the heat-shrinkable package 34, a shipment number of the heat-shrinkable package 34, or any other type of information. In some embodiments, the label 82 has an adhesive backing that allows the back of the label 82 to be adhered to the heat-shrinkable film of the heat-shrinkable package 34. In some embodiments, the label 82 is affixed to the heat-shrinkable film either upstream or downstream of the end sealer 28.

As the heat-shrinkable package 34 moves through the heat shrink system 80, the heat shrink system 80 causes the heat-shrinkable film in the heat-shrinkable package 34 to shrink and form the heat-shrunk package 34'. However, the material of the label 82 does not shrink as much as the heat-shrinkable film shrinks under the same conditions. As shown in FIG. 2B, the heat shrink process by the heat shrink system 80 causes the identifier on the label 82 to be deformed on the heat-shrunk package 34'. In some cases, the identifier on the deformed label 82 is illegible either by machine, in the case of machine-readable information (e.g., barcode, QR code), or by human, in the case of human-readable information. If the deformed label 82 is no longer legible, then the object 36 inside the heat-shrunk package 34' and/or the heat-shrunk package 34' itself is still not able to be identified even though the label 82 was applied before the heat-shrinkable package 34 passed through the heat shrink system 80.

Figure 3A:
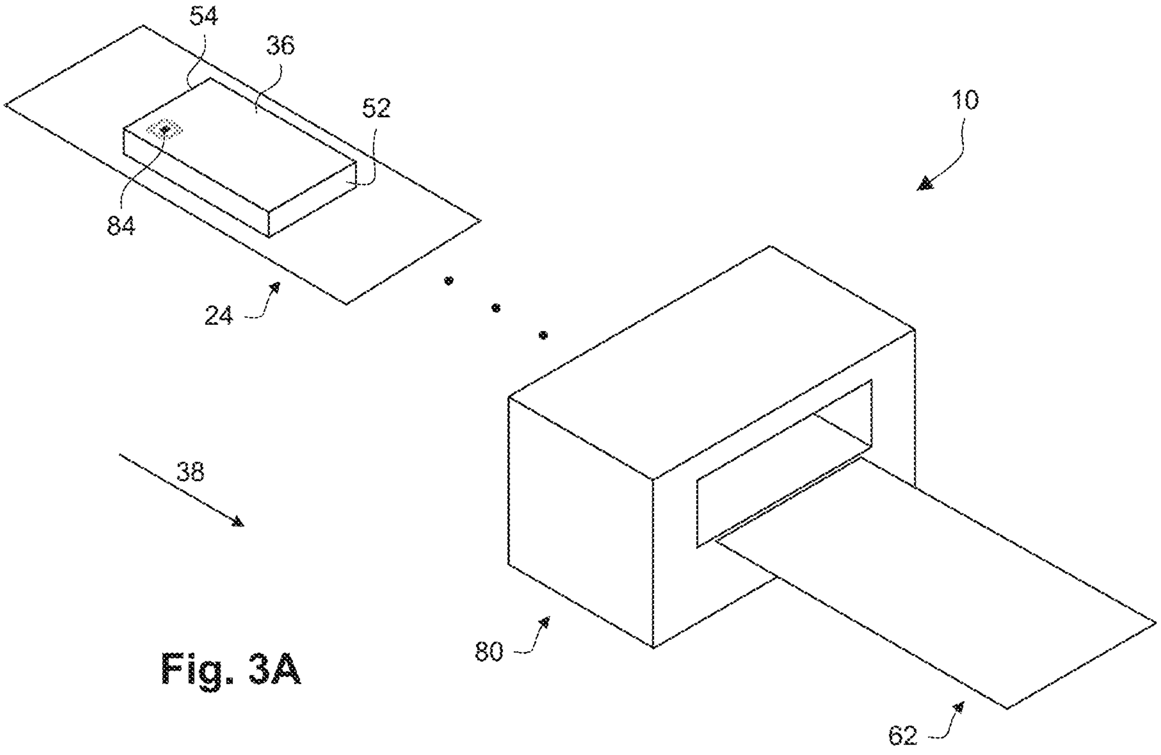
FIGS. 3A and 3B depict an embodiment of identifying a heat-shrunk package using an electromagnetic field identifier, in accordance with the embodiment disclosed herein.
Figure 3B:
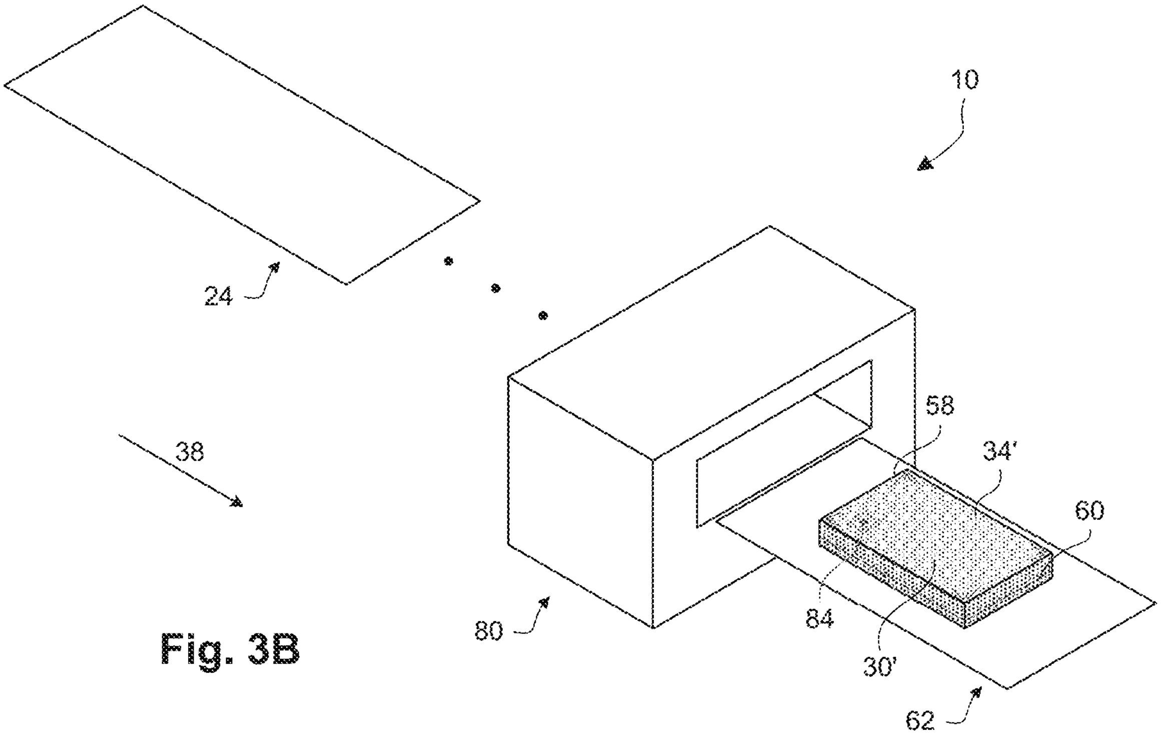

Depicted in FIGS. 3A and 3B is an embodiment of identifying a heat-shrunk package 34' using an electromagnetic field identifier. A portion of the shrink wrap system 10 is shown in each of FIGS. 3A and 3B, and each of FIGS. 3A and 3B depicts a different instance in time. In the instance shown in, an electromagnetic tag 84 has been placed on the object 36 itself before it is wrapped in any heat-shrinkable film 30. In some embodiments, the electromagnetic tag 84 is a radio-frequency identification (RFID) tag that contains electronically-stored information and is capable of collect energy from a nearby RFID reader's interrogating radio waves. In some examples, the electronically-stored information identifies one or more of the object 36 in the heat-shrinkable package 34 and/or the heat-shrinkable package 34 itself.

After electromagnetic tag 84 has been placed on the object 36, the object 36 is them carried through the shrink wrap system 10 until it is packaged into the heat-shrunk package 34', as shown in the instance depicted in FIG. 3B. As depicted, the electromagnetic tag 84 remains on the object 36 through the wrapping and the heat shrink processes. The electromagnetic tag 84 is capable of being interrogated and read through the heat-shrunk film 30' of the heat-shrunk package 34'. In this way, the electromagnetic tag 84 can provide an identifier of the object 36 and/or the heat-shrunk package 34' without the need to open or break the heat-shrunk package 34'. However, electromagnetic tags can be expensive to add to every product that is processed through the shrink wrap system 10 and the cost of these tags may not justify the benefits gained by their use.

Figure 4A:
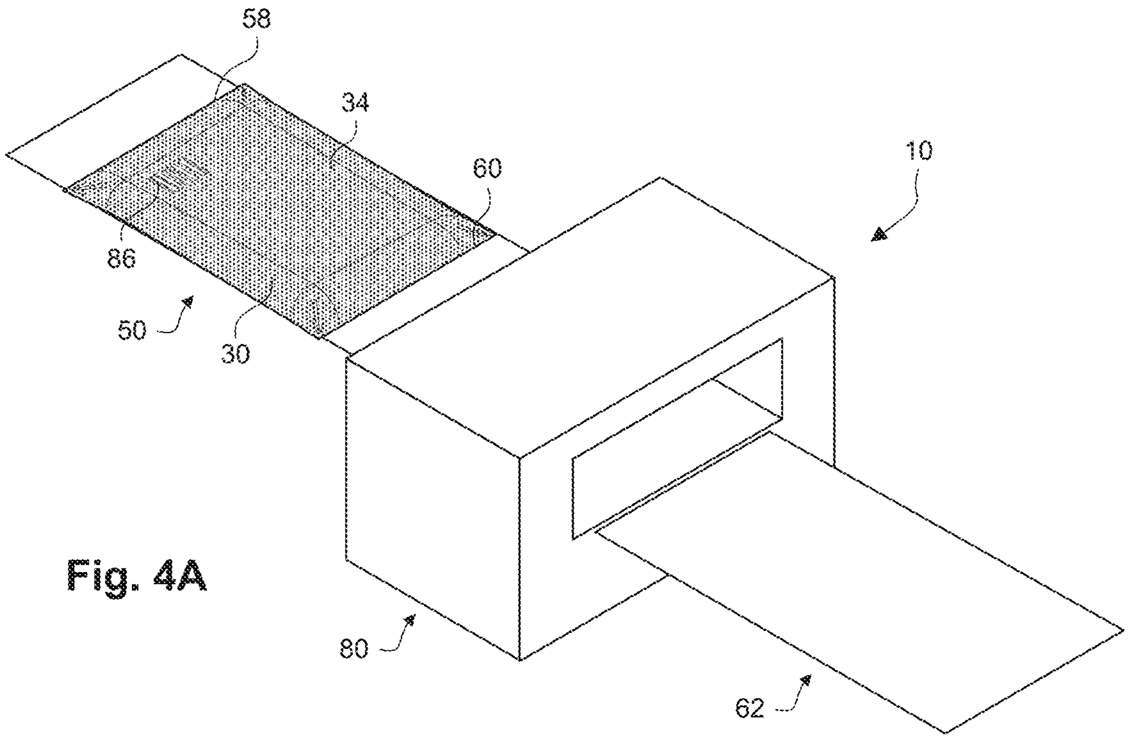
FIGS. 4A and 4B depict an embodiment of identifying a heat-shrunk package using a label printed directly onto heat-shrinkable film, in accordance with the embodiment disclosed herein.
Figure 4B:
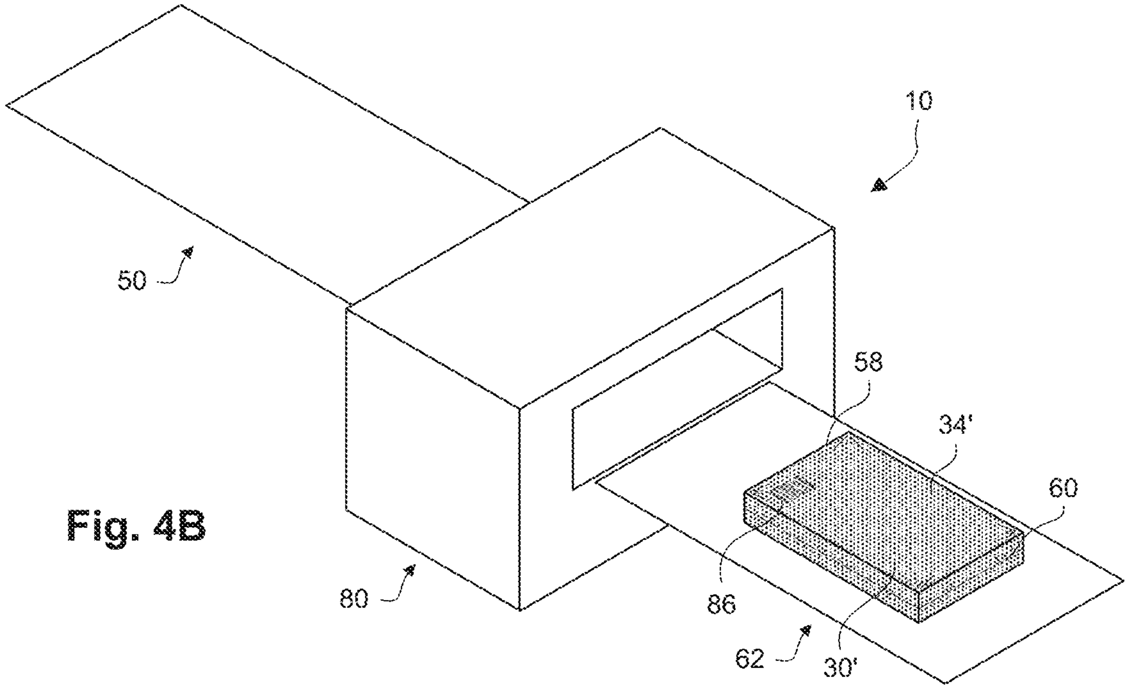

Depicted in FIGS. 4A and 4B is an embodiment of identifying a heat-shrunk package 34' using a label printed directly onto heat-shrinkable film. A portion of the shrink wrap system 10 is shown in each of FIGS. 4A and 4B, and each of FIGS. 4A and 4B depicts a different instance in time. In the instance shown in FIG. 4A, a printed label 86 has been printed directly onto the heat-shrinkable film 30 of the heat-shrinkable package 34 before it is transported to the heat shrink system 80 in the conveyance direction 38. In some embodiments, the printed label 86 contains an identifier usable to identify the object 36 in the heat-shrinkable package 34 and/or the heat-shrinkable package 34 itself. Some examples of information that can be included in the identifier on the label include human-readable information and/or a computer-readable code (e.g., barcode, quick response (QR) code, etc.) identifying the object 36, a serial number of the object 36, shipping information for the heat-shrinkable package 34, a shipment number of the heat-shrinkable package 34, or any other type of information. In some embodiments, the printed label 86 is printed onto the heat-shrinkable film 30 using one or more of an ink jet printing process, a laser jet printing process, or any other type of printing process. In some embodiments, the printed label 86 is printed onto the heat-shrinkable film 30 either upstream or downstream of the end sealer 28. In some embodiments, the printed label 86 is printed in a contrasting color from the color of the heat-shrinkable film 30 (e.g., a white printed label 86 on a black heat-shrinkable film 30, a black printed label 86 on a white heat-shrinkable film 30, an orange printed label 86 on a blue heat-shrinkable film 30, etc.).

As the heat-shrinkable package 34 moves through the heat shrink system 80, the heat shrink system 80 causes the heat-shrinkable film 30 in the heat-shrinkable package 34 to shrink into heat-shrunk film 30' and to form the heat-shrunk package 34', as shown in FIG. 4B. The printed label 86 shrinks with the shrinking of the heat-shrinkable film 30. In some embodiments, the amount of shrink expected during the heat shrink process is taken into account when printing the identifier of the printed label 86 on the heat-shrinkable film 30 so that the identifier has a particular appearance after the heat shrink system 80 causes the heat-shrinkable film 30 in the heat-shrinkable package 34 to shrink and form the heat-shrunk package 34'. In particular, after the heat-shrunk package 34' is formed, the identifier on the printed label 86 may be human- and/or machine-readable to identify the object 36 and/or the heat-shrunk package 34'.

Figure 5A:
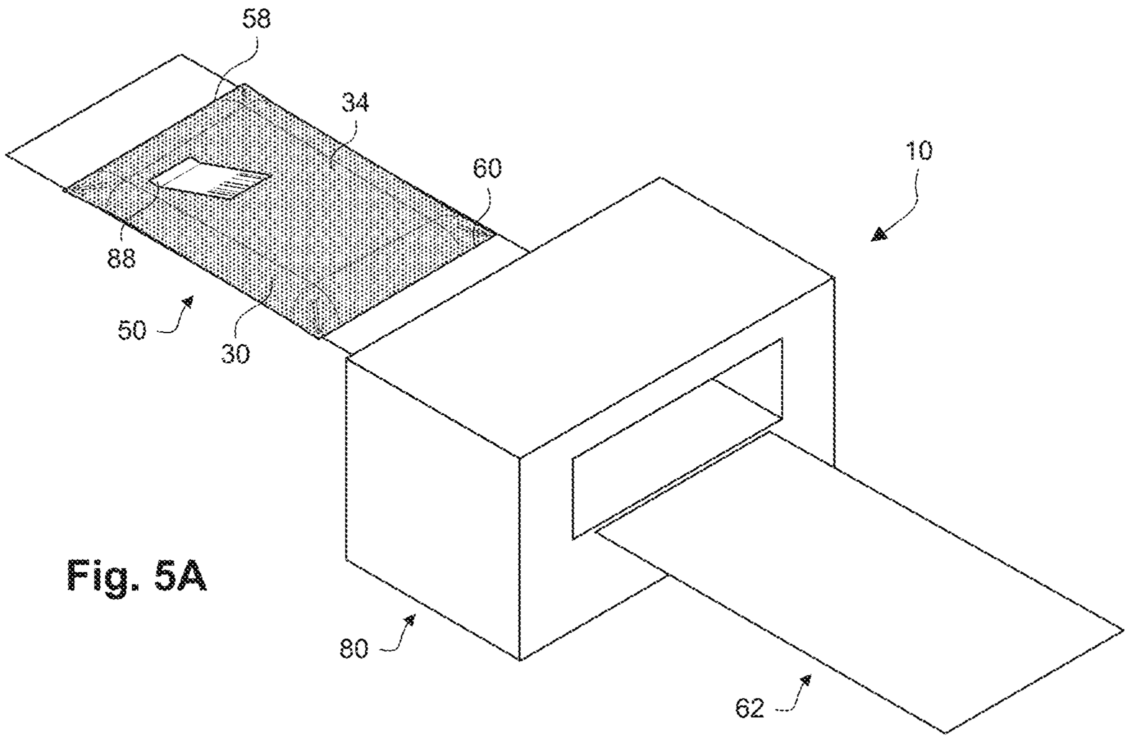
FIGS. 5A and 5B depict an embodiment of identifying a heat-shrunk package using a label that is partially-adhesive, in accordance with the embodiment disclosed herein.
Figure 5B:
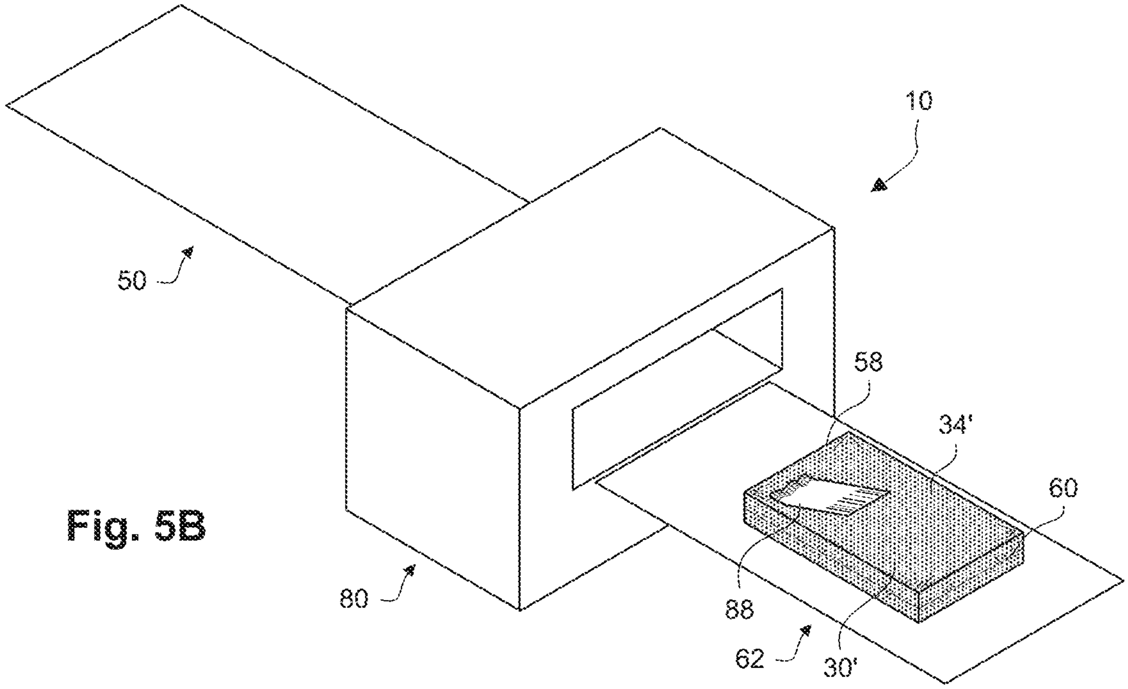

Depicted in FIGS. 5A and 5B is an embodiment of identifying a heat-shrunk package 34' using a label that is partially-adhesive. As used herein, the term partially-adhesive label refers to a label that has adhesive one side of the label but the adhesive is not exposed on the entire side of the label. In some embodiments, the percentage of the side of the label that has exposed adhesive is at or below any one of the following values: 10%, 15% 20%, 25%, 30%, 35%, 40%, 45%, 50%, 55%, 60%, 65%, 70%, 75%, 80%, 85%, and 90%. Additional embodiments of partially-adhesive are discussed below. A portion of the shrink wrap system 10 is shown in each of FIGS. 5A and 5B, and each of FIGS. 5A and 5B depicts a different instance in time.

In the instance shown in FIG. 5A, a partially-adhesive label 88 has been placed on the heat-shrinkable package 34 before it is transported to the heat shrink system 80 in the conveyance direction 38. In some embodiments, the partially-adhesive label 88 contains an identifier usable to identify the object 36 in the heat-shrinkable package 34 and/or the heat-shrinkable package 34 itself. Some examples of information that can be included in the identifier on the label include human-readable information and/or a computer-readable code (e.g., barcode, quick response (QR) code, etc.) identifying the object 36, a serial number of the object 36, shipping information for the heat-shrinkable package 34, a shipment number of the heat-shrinkable package 34, or any other type of information. In some embodiments, an adhesive backing is exposed on one side of a portion of the partially-adhesive label 88 and an identifier is placed on a portion of the partially-adhesive label 88 that does not have adhesive exposed on one side. In some embodiments, the partially-adhesive label 88 is affixed to the heat-shrinkable film either upstream or downstream of the end sealer 28.

As the heat-shrinkable package 34 moves through the heat shrink system 80, the heat shrink system 80 causes the heat-shrinkable film in the heat-shrinkable package 34 to shrink and form the heat-shrunk package 34'. The material of the partially-adhesive label 88 does not shrink as much as the heat-shrinkable film 30 shrinks under the same conditions. As shown in FIG. 5B, the heat shrink process by the heat shrink system 80 causes the partially-adhesive label 88 to be deformed on the heat-shrunk package 34' in the area where the adhesive is adhered to the heat-shrunk film. However, the portion of the partially-adhesive label 88 that is not adhered to the heat-shrunk film remains substantially undeformed. This permits the identifier on the partially-adhesive label 88 to be read by machine, in the case of machine-readable information (e.g., barcode, QR code), or by human, in the case of human-readable information.

In some embodiments, the partially-adhesive label 88 is used as a temporary label that is used to identify the object 36 and/or the heat-shrunk package 34' before it is shipped. For example, as objects are received into a warehouse, they may be packaged into heat-shrunk packages that are tagged with partially-adhesive tags. The heat-shrunk packages are inventoried, with the partially-adhered tags on the heat-shrunk packages as identifiers, until the heat-shrunk packages are prepared for shipping and then shipped to customers. Examples of using the partially-adhesive label 88 as a temporary label are depicted in FIGS. 6A and 6B and in FIGS. 6C and 6D.

Figure 6A:
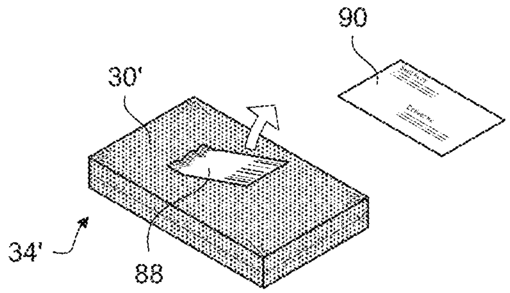
FIGS. 6A and 6B depict an example of using a partially-adhesive label as a temporary label, in accordance with the embodiment disclosed herein.
Figure 6B:
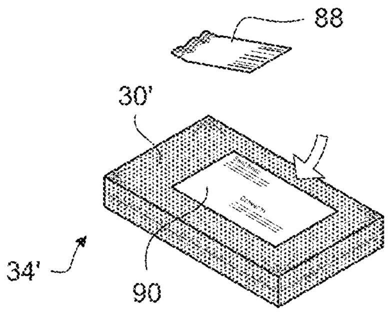

In FIGS. 6A and 6B, the partially-adhesive label 88 is replaced by a shipping label 90. More specifically, the partially-adhesive label 88 is initially adhered to the heat-shrunk film 30' of the heat-shrunk package 34', as shown in FIG. 6A. As further shown in FIG. 6A, the partially-adhesive label 88 is removed from the heat-shrunk package 34'. As shown in FIG. 6B, the shipping label 90 is adhered to the heat-shrunk film 30' of the heat-shrunk package 34'. In some embodiments, the shipping label 90 is adhered to the heat-shrunk package 34' over the area where the partially-adhesive label 88 had been adhered to the heat-shrunk package 34'. In this way, the shipping label 90 covers any non-uniformity in the heat-shrunk film 30' due to the partially-adhesive label 88, such as non-uniformity caused during the heat shrink-process due to the presence of the adhered partially-adhesive label 88, non-uniformity caused by the removal of the partially-adhesive label 88 from the heat-shrunk film 30', etc. In some embodiments, the partially-adhesive label 88 is discarded after it has been removed from the heat-shrunk package 34'.

Figure 6C:
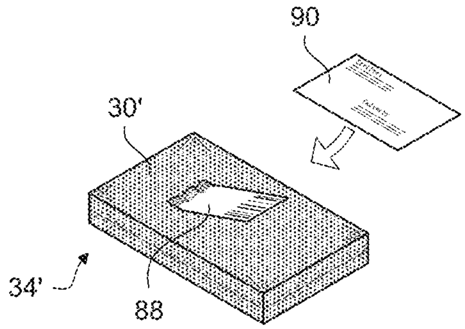
FIGS. 6C and 6D depict another example of using a partially-adhesive label as a temporary label, in accordance with the embodiment disclosed herein.
Figure 6D:
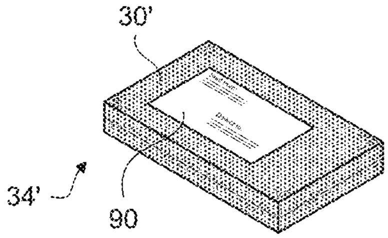

In FIGS. 6C and 6D, the partially-adhesive label 88 is left on the heat-shrunk package 34' when the shipping label 90 is adhered to the heat-shrunk package 34'. Instead of the partially-adhesive label 88 being removed from the heat-shrunk package 34', as was the case in FIGS. 6A and 6B, the partially-adhesive label 88 is left on the heat-shrunk package 34' in FIGS. 6C and 6D. The shipping label 90 is adhered to the heat-shrunk package 34' while the partially-adhesive label 88 is still on the heat-shrunk package 34'. In the depicted embodiment, the shipping label 90 is adhered to the heat-shrunk package 34' so that the shipping label 90 completely covers the partially-adhesive label 88 on the heat-shrunk package 34'.

In both any of the cases where the partially-adhesive label 88 is used as a temporary label, the identifier on the partially-adhesive label 88 may be used to create the shipping label 90. In some embodiments, the identifier includes machine-readable code, such as a barcode or QR code. The identifier is read by one or more computing devices, the information obtained from the identifier is used to generate and or obtain the information to be printed on the shipping label 90. The one or more computing devices then cause the shipping label 90 to be printed. The printed shipping label 90 can then be used to replace and/or cover the partially-adhesive label 88.

Figure 7:
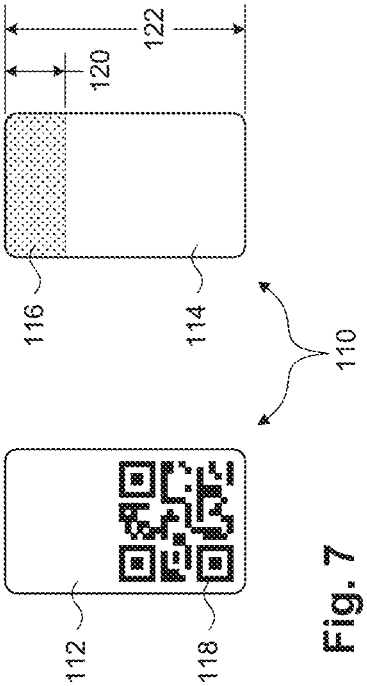
FIG. 7 and FIGS. 8A and 8B depict embodiments of partially-adhesive labels, in accordance with the embodiment disclosed herein.
Figure 8B:
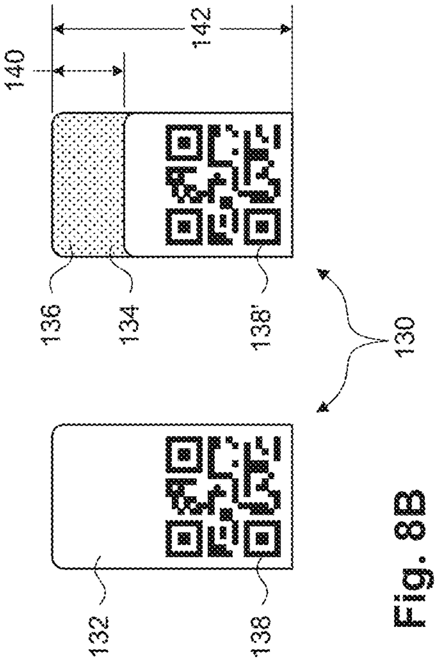
Figure 8A:
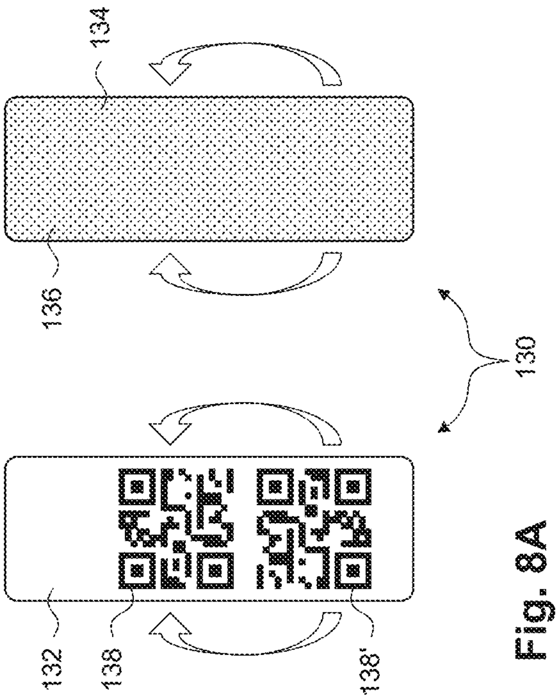

Embodiments of partially-adhesive labels are depicted in FIG. 7 and in FIGS. 8A and 8B. More specifically, a partially-adhesive label 110 is depicted in FIG. 7 and a partially-adhesive label 130 is depicted in unfolded and folded states, respectively, in FIGS. 8A and 8B. The partially-adhesive label 110 includes a front side 112 and a back side 114. An adhesive 116 covers a portion of the back side 114 of the partially-adhesive label 110. An identifier 118 is printed on the front side 112 of the partially-adhesive label 110. In some embodiments, the identifier 118 includes human- and/or machine-readable information usable to identify a product and/or a package. While the identifier 118 in the depicted embodiment is located on the front side 112, the identifier could alternatively be located on the back side 114 or on both of the front side 112 and the back side 114. In the depicted embodiment, the adhesive 116 extends down a length 120 that is less than an overall length 122 of the partially-adhesive label 110. In some embodiments, the length 120 of the adhesive 116 is a percentage of the overall length 122 of the partially-adhesive label 110 that is at or below any one of the following values: 10%, 15% 20%, 25%, 30%, 35%, 40%, 45%, 50%, 55%, 60%, 65%, 70%, 75%, 80%, 85%, and 90%.

The partially-adhesive label 130 includes a front side 132 and a back side 134. As shown in FIG. 8A, an adhesive 136 covers the entirety of the back side 134 of the partially-adhesive label 130 in the unfolded state. In addition, a first identifier 138 and a second identifier 138' are located on the front side 132 of the partially-adhesive label 130 in the unfolded state. In some embodiments, the first identifier 138 and the second identifier 138' include human- and/or machine-readable information usable to identify a product and/or a package. In some embodiments, the first identifier 138 and the second identifier 138' contain the same information. The partially-adhesive label 130 is capable of being folded from the unfolded state shown in FIG. 8A to the folded state shown in FIG. 8B so that portions of the adhesive 136 are adhered to each other.

As shown in FIG. 8B, a portion of the adhesive 136 remains exposed on the back side 134 of the partially-adhesive label 130 after the partially-adhesive label 130 is folded. In addition, the first identifier 138 remains on the front side 132 of the partially-adhesive label 130 and the second identifier 138' is located on the back side 134 of the partially-adhesive label 130 after the partially-adhesive label 130 is folded. While the partially-adhesive label 130 includes identifiers on both the front side 132 and the back side 134, the partially-adhesive label 130 may have an identifier on only one of the front side 132 and the back side 134 in other embodiments. In the depicted embodiment, the exposed portion of the adhesive 136 extends down a length 140 that is less than an overall length 142 of the partially-adhesive label 130. In some embodiments, the length 140 of the adhesive 136 is a percentage of the overall length 142 of the partially-adhesive label 130 that is at or below any one of the following values: 10%, 15% 20%, 25%, 30%, 35%, 40%, 45%, 50%, 55%, 60%, 65%, 70%, 75%, 80%, 85%, and 90%.

With both the partially-adhesive label 110 and the folded partially-adhesive label 130, adhesive is exposed on one side of the label in only a portion of that side. In addition, identifiers are located on the labels outside of the area with the exposed adhesive and outside of the area on the other side of the label from the exposed adhesive. This permits deformation of the label in the area where the adhesive is exposed without significant deformation of the identifiers. The partially-adhesive label 110 and the folded partially-adhesive label 130 can thus be adhered to heat-shrinkable film 30, deformed in the portion of the label with the exposed adhesive during the heat-shrink process, and still be read by human and/or machine after the heat-shrink process.

Figure 9:
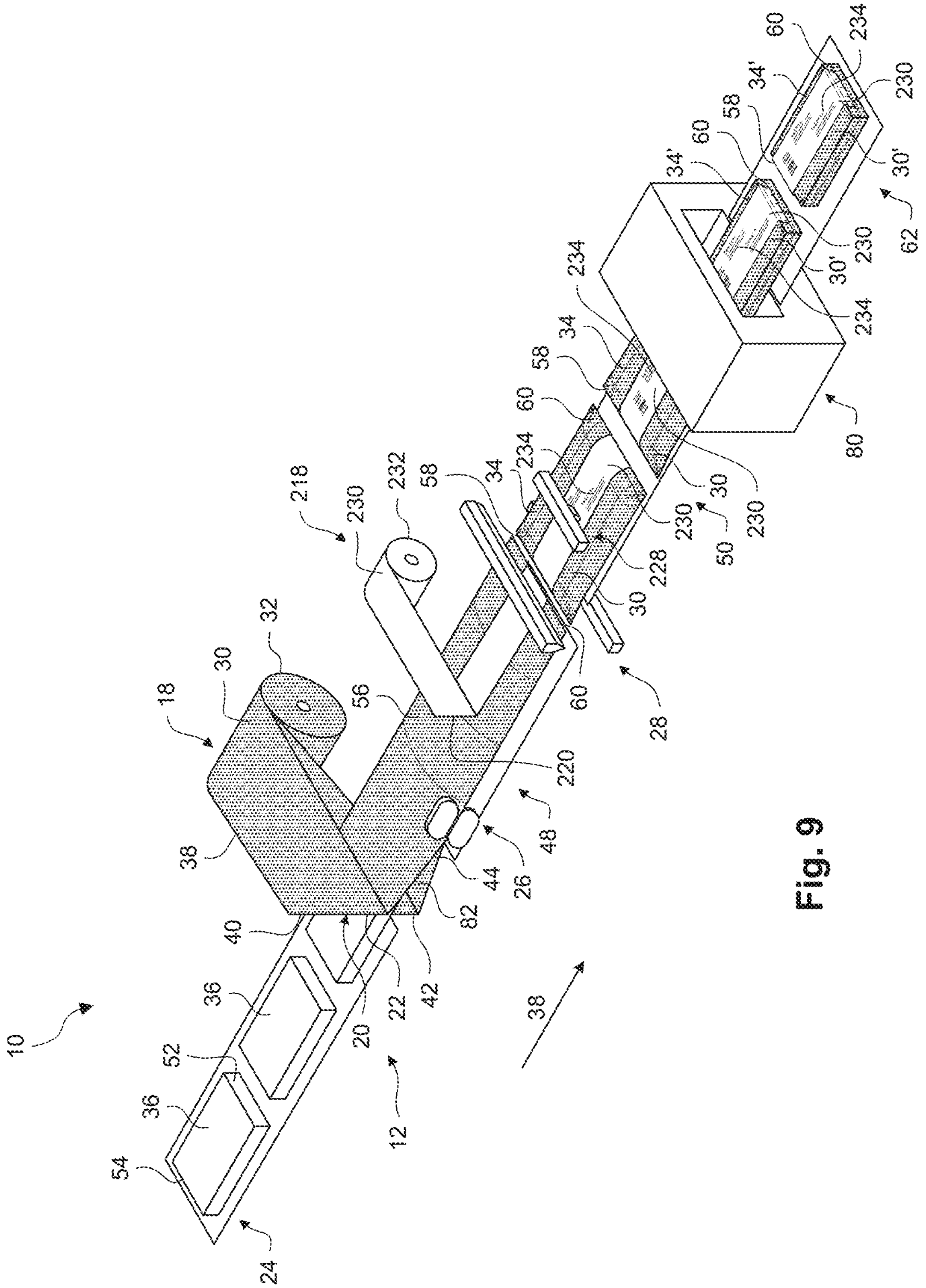
FIG. 9 depicts an embodiment of identifying a heat-shrunk package using a film band, in accordance with the embodiment disclosed herein.

Depicted in FIG. 9 is an embodiment of identifying a heat-shrunk package 34' using a film band. A modified version of the shrink wrap system 10 is shown in FIG. 9, with the addition of a film dispenser 218 that supplies a web of label film 230 from roll 232. Systems for supplying webs of film are known in art and may include unwind mechanisms and other features. In some embodiments, the label film 230 is configured to remain in substantially the same form (e.g., not shrunk) when undergoing conditions that cause the heat-shrinkable film 30 to shrink during the heat-shrink process. In some embodiments, the label film 230 is configured to shrink less than a percentage of the shrinkage of the heat-shrinkable film 30 under similar conditions. In some examples, relative to the amount of shrinkage of the heat-shrinkable film 30 under similar conditions, the label film 230 is configured to shrink less than or equal to any one of the following values: 10%, 20%, 30%, 40%, 50%, 60%, 70%, 80%, and 90%.

A transfer head 220 receives the web of label film 230 from the film dispenser 218. The transfer head 220 is adapted to redirects the web of label film 230 over the top of the tube 56 of heat-shrinkable film 30. In the depicted embodiment, the web of label film 230 is narrower than the tube 56 of heat-shrinkable film 30 and the label film 230 is arranged so that it does not extend beyond the sides of the tube 56 of heat-shrinkable film 30. The label film 230 is fed with the tube 56 until both the tube 56 and the label film 230 are cut and sealed by the end sealer 28. The trailing edge seal 58 and the leading edge seal 60 formed by the end sealer 28 seal the cut ends of the heat-shrinkable film 30 to the cut ends of the label film 230. In some embodiments, the label film 230 is connected to the heat-shrinkable film 30 only at the trailing edge seal 58 and the leading edge seal 60. In this way, the label film 230 is formed into a band that spans across the top of the heat-shrinkable package 34 and is connected to the heat-shrinkable film 30 only on the sides of the band.

The modified version of the shrink wrap system 10 in FIG. 9 also includes a printer 228 that is configured to print an identifier 234 directly onto the band of label film 230 before the heat-shrinkable package 34 is transported to the heat shrink system 80. In some embodiments, the identifier 234 contains information usable to identify the object 36 in the package 34 and/or the heat-shrinkable package 34 itself. Some examples of information that can be included on the label include human-readable information and/or a computer-readable code (e.g., barcode, quick response (QR) code, etc.) identifying the object 36, a serial number of the object 36, shipping information for the heat-shrinkable package 34, a shipment number of the heat-shrinkable package 34, or any other type of information. In some embodiments, the identifier 234 is printed onto the band of label film 230 using one or more of an ink jet printing process, a laser jet printing process, or any other type of printing process. In the depicted embodiment, the printer 228 is located downstream from the end sealer 28, but the printer 228 could also be located upstream of the end sealer 28. In some embodiments, the identifier 234 is printed in a contrasting color from the color of the label film 230 (e.g., a white identifier 234 on a black label film 230, a black identifier 234 on a white label film 230, an orange identifier 234 on a blue label film 230, etc.).

As the heat-shrinkable package 34 moves through the heat shrink system 80, the heat shrink system 80 causes the heat-shrinkable film 30 in the heat-shrinkable package 34 to shrink into heat-shrunk film 30' and to form the heat-shrunk package 34'. However, the heat shrink system 80 does not have the same shrinking effect on the label film 230. More specifically, under the conditions inside the heat shrink system 80, the label film 230 either does not deform or does not deform as much as the heat-shrinkable film 30 deforms. This difference in the material of the label film 230 leaves the identifier 234 on the label film 230 substantially legible to humans and/or machines. In addition, because the label film 230 does not shrink as much as the heat-shrinkable film 30 does during the heat shrink process, the label film 230 may feel "loose" on the top of the heat-shrunk package 34' as if it is a handle for the package. However, even if the label film 230 is used as a handle on the heat-shrunk package 34', the label film 230 should remain attached to the heat-shrunk package 34' because it is sealed to the heat-shrunk film 30' at the trailing edge seal 58 and the leading edge seal 60. In addition, the heat shrink process may cause some distortions of the label film 230 near the trailing edge seal 58 and the leading edge seal 60 because of the difference in material between the label film 230 and the heat-shrinkable film 30. In some embodiments, the portion of the label film 230 with the identifier 234 is substantially undeformed by the heat shrink process.

Figure 10A:
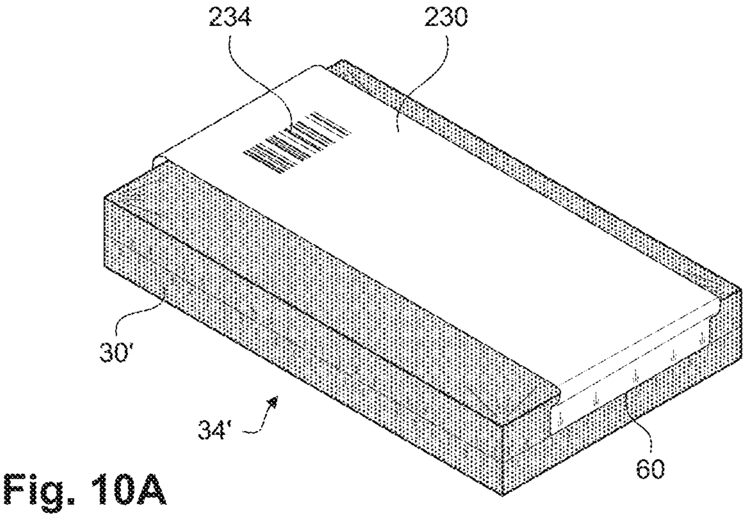
FIGS. 10A and 10B depict instances of an alternate method of using a label film, in accordance with the embodiment disclosed herein.
Figure 10B:
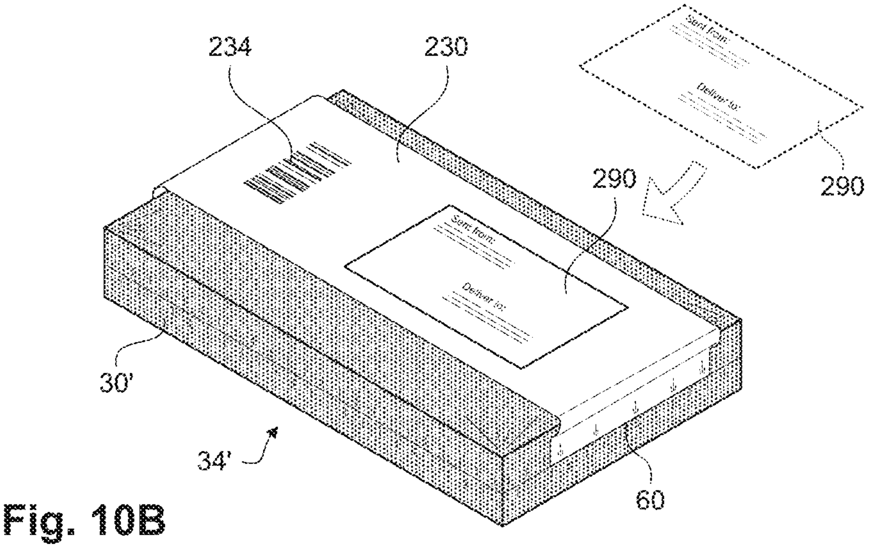

An alternate method of using the label film 230 is depicted in two instances shown in FIGS. 10A and 10B. In the instance shown in FIG. 10A, the label film 230 include the identifier 234 that has the form of a barcode. In some embodiments, the barcode in the identifier 234 identifies the object inside of the heat-shrunk package 34'. The heat-shrunk package 34' may be stored in this condition, such as in a warehouse prior to shipment to a customer. When the heat-shrunk package 34' is prepared to be shipped to a customer, the barcode in the identifier 234 may be read by a machine, such as a computing device with a coupled barcode scanner, to identify the object 36 in the heat-shrunk package 34'. Based on the information obtained from the identifier 234, the computing device can cause a shipping label 290 to be created. As shown in FIG. 10B, the shipping label 290 can be applied to the label film 230 prior to shipping the heat-shrunk package 34'. In other embodiments, the shipping label 290 can be applied to the heat-shrunk film 30' and the label film 230 can be removed prior to shipping the heat-shrunk package 34'. In other embodiments, the shipping label 290 can be applied partially over the label film 230 and partially over the heat-shrunk film 30'.

The various embodiments depicted herein show labels and identifiers in the form of barcodes, QR codes, shipping labels, and the like. However, the type of information included on labels and identifiers is not limited to these forms of information. Any type of information can be included on labels and identifiers, including serial numbers, model numbers, part numbers, branding (e.g., word marks, logos, etc.), images, instructions, messages, warnings, certifications, advertisements, any other form of information, or any combination thereof. In addition, while the examples of machine-readable codes herein include barcodes and QR codes, the embodiments described herein are capable of using any form of machine-readable information, such as magnetic strips or other forms of magnetic media, optical-readable discs or other forms of optical-readable media, magnetic ink or other forms of machine-identifiable ink, or any other type of producing machine-readable information.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A method of packaging an object, comprising:
placing an object inside of heat-shrinkable film;
sealing the heat-shrinkable film around the object to form a heat-shrinkable package;
coupling a first portion of a label to the heat-shrinkable package such that the first portion of the label is affixed directly to an exterior of the heat-shrinkable film and a second portion of the label is not affixed directly to the exterior of the heat-shrinkable film, wherein the second portion of the label includes an identifier; and
causing the heat-shrinkable film to shrink into heat-shrunk film and the heat-shrinkable package to form into a heat-shrunk package;
wherein the label remains coupled to the heat-shrunk film after the heat-shrinkable film is caused to shrink into heat-shrunk film; and
wherein the second portion of the label remains substantially undeformed after the heat-shrinkable film is caused to shrink into heat-shrunk film; and
wherein the method further comprises:
creating a second label based on information obtained from the identifier, and
after causing the heat-shrinkable film to shrink into heat-shrunk film, coupling the second label on at least one of the heat-shrunk film or the label.

2. The method of claim 1, wherein the heat-shrunk film is opaque.

3. The method of claim 1, wherein the identifier contains information identifying at least one of the object or the heat-shrunk package.

4. The method of claim 1, wherein the identifier contains information that is human- and/or machine-readable.

5. The method of claim 4, wherein the information remains human- and/or machine-readable after the heat-shrinkable film is caused to shrink into heat-shrunk film.

6. The method of claim 1, wherein the label is a partially-adhesive label comprising an adhesive exposed on one side of the first portion the label.

7. The method of claim 6, wherein coupling the label to the heat-shrinkable package comprises adhering the exposed adhesive to the heat-shrinkable film.

8. The method of claim 1, further comprising:
removing the label from the heat-shrunk film before coupling the second label to the heat-shrunk film;
wherein the second label is coupled to the heat-shrunk film in place of the removed label.

9. The method of claim 1, wherein the second label is coupled to at least the heat-shrunk film and the label such that the label is covered by the second label.

10. A method of packaging an object, comprising:
placing an object inside of heat-shrinkable film;
sealing the heat-shrinkable film around the object to form a heat-shrinkable package;
coupling a first portion of a label to the heat-shrinkable package such that the first portion of the label is affixed directly to an exterior of the heat-shrinkable film and a second portion of the label is not affixed directly to the exterior of the heat-shrinkable film, wherein the section portion of the label includes an identifier; and
causing the heat-shrinkable film to shrink into heat-shrunk film and the heat-shrinkable package to form into a heat-shrunk package;

wherein the label remains coupled to the heat-shrunk film after the heat-shrinkable film is caused to shrink into heat-shrunk film;

wherein the second portion of the label remains substantially undeformed after the heat-shrinkable film is caused to shrink into heat-shrunk film;

wherein the label includes a side that is covered by adhesive; and wherein the method further comprises forming the partially-adhesive label by folding the label from an unfolded state to a folded state by folding the adhesive against itself so that at least a portion of the adhesive remains exposed when the label is in the folded state.

11. A method of packaging an object, comprising:

placing an object inside of heat-shrinkable film;

sealing the heat-shrinkable film around the object to form a heat-shrinkable package;

coupling a first portion of a label to the heat-shrinkable package such that the first portion of the label is affixed directly to an exterior of the heat-shrinkable film and a second portion of the label is not affixed directly to the exterior of the heat-shrinkable film, wherein the section portion of the label includes an identifier; and causing the heat-shrinkable film to shrink into heat-shrunk film and the heat-shrinkable package to form into a heat-shrunk package;

wherein the label remains coupled to the heat-shrunk film after the heat-shrinkable film is caused to shrink into heat-shrunk film; and wherein the second portion of the label remains substantially undeformed after the heat-shrinkable film is caused to shrink into heat-shrunk film;

wherein coupling the label to the heat-shrinkable package comprises a label film in the form of a band that spans a side of the heat-shrinkable package.

12. The method of claim 11, wherein sealing the heat-shrinkable film around the object to form the heat-shrinkable package comprises forming a leading edge seal and a trailing edge seal in the heat-shrinkable film.

13. The method of claim 12, wherein forming the leading edge seal and the trailing edge seal in the heat-shrinkable film comprises sealing a first end of the band of the label film to the leading edge seal and sealing a second end of the band of the label film to the trailing edge seal.

14. The method of claim 11, wherein, under conditions that cause the heat-shrinkable film to shrink into the heat-shrunk film, the label film is configured to shrink less than or equal to a percentage of shrinkage of the heat-shrinkable film, and wherein the percentage of the shrinkage of the heat-shrinkable film is any one of the following values: 10%, 20%, 30%, 40%, or 50%.

* * * * *